Nov. 14, 1967     E. C. PROCTER     3,352,093
FORAGE HARVESTER
Filed June 8, 1965     3 Sheets-Sheet 1
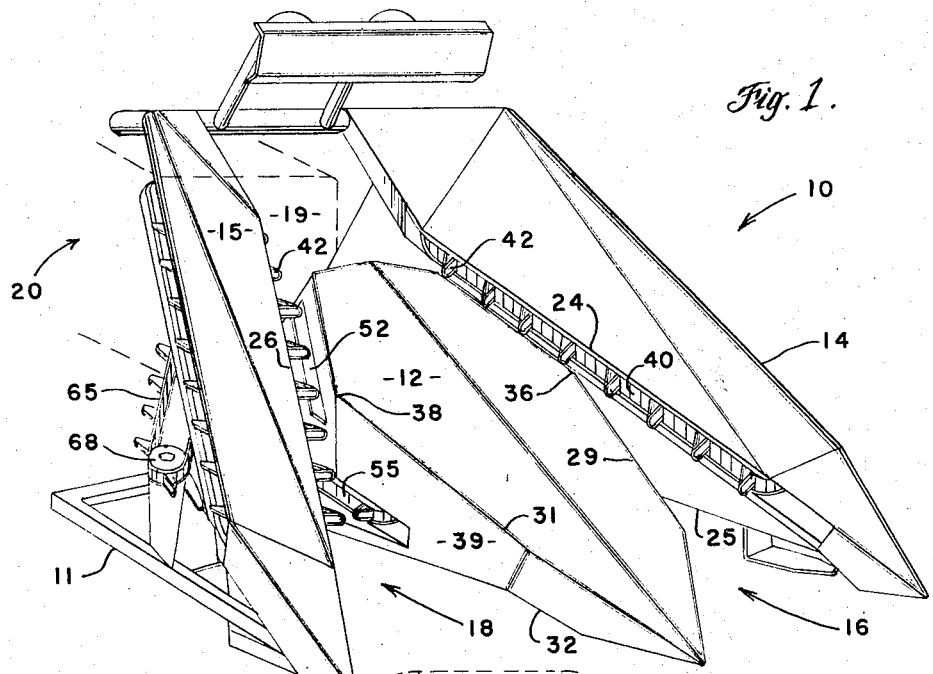
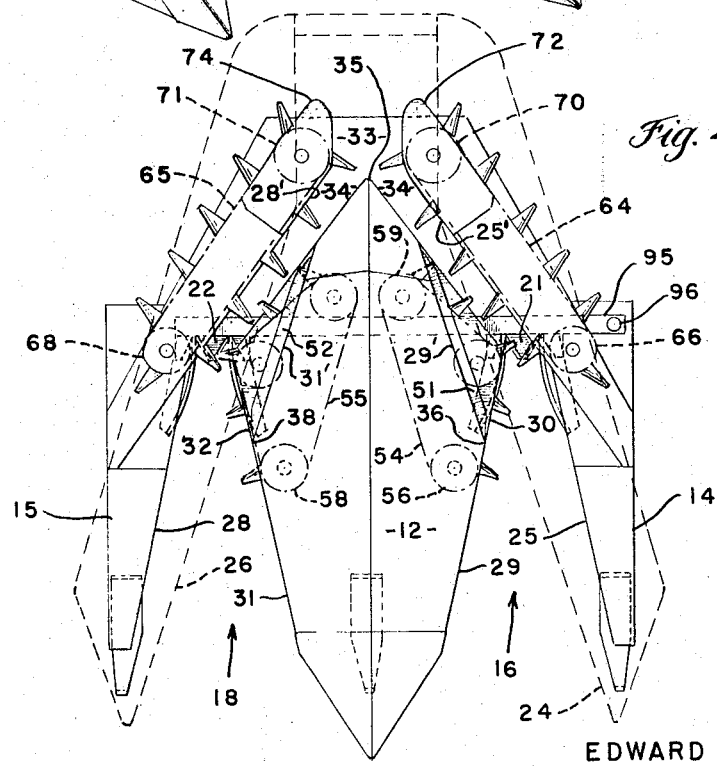
INVENTOR.
EDWARD C. PROCTER
BY Walter V. Wright
AGENT Nov. 14, 1967  E. C. PROCTER  3,352,093
FORAGE HARVESTER
Filed June 8, 1965  3 Sheets-Sheet 2
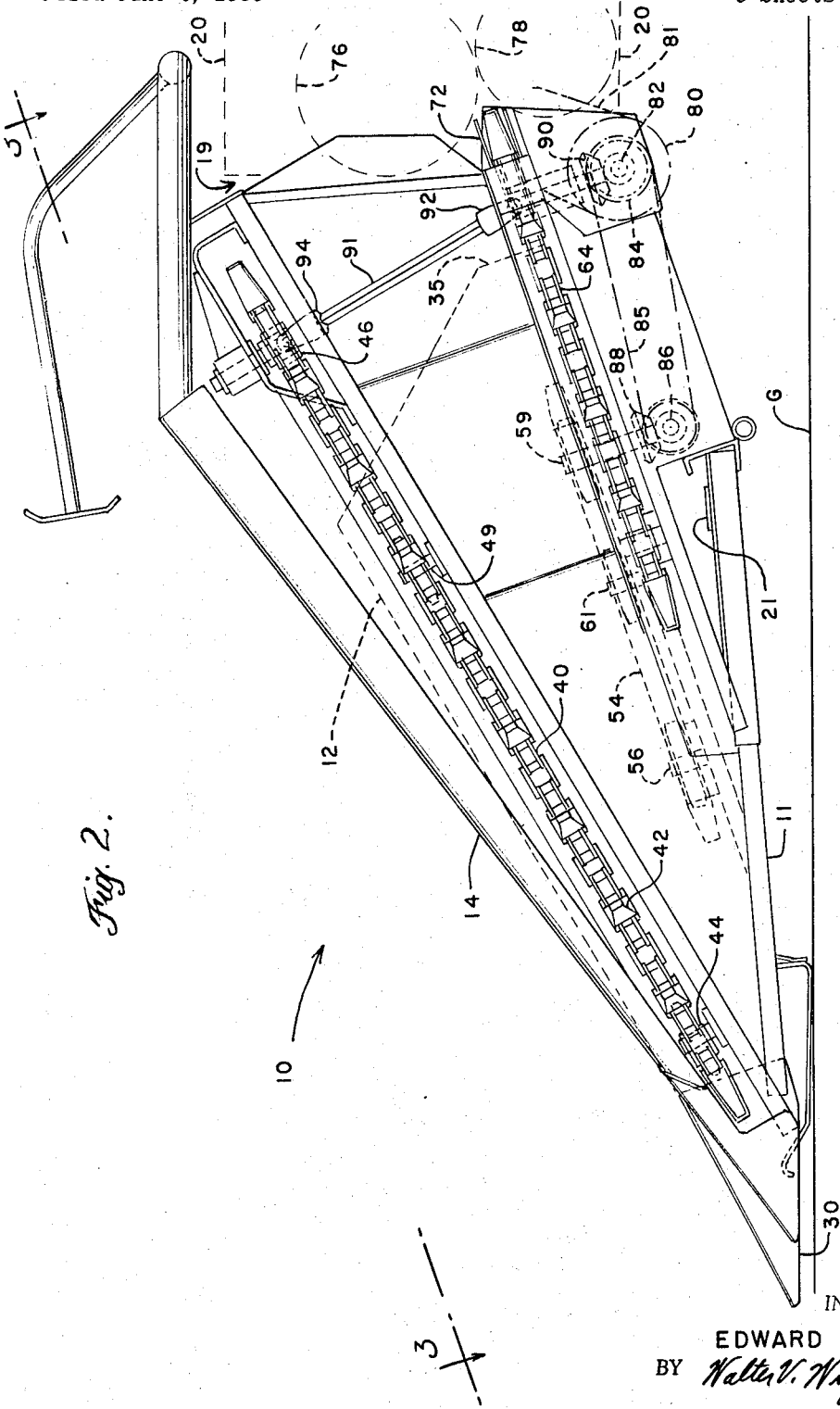
INVENTOR.
EDWARD C. PROCTER
BY *Walter V. Wright*
AGENT

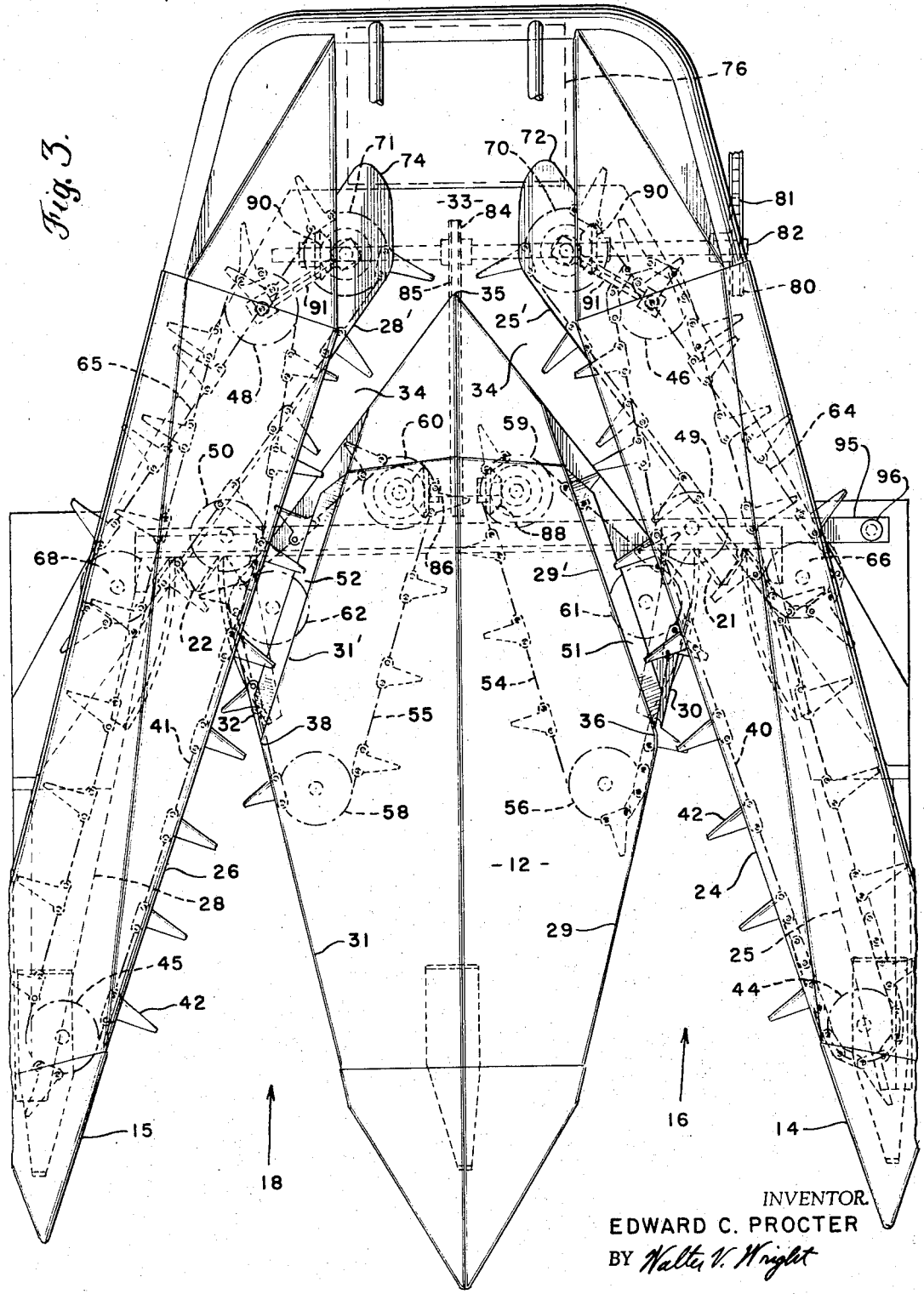

United States Patent Office 3,352,093
Patented Nov. 14, 1967

3,352,093
FORAGE HARVESTER
Edward C. Procter, New Holland, Pa., assignor to Sperry Rand Corporation, New Holland, Pa., a corporation of Delaware
Filed June 8, 1965, Ser. No. 462,188
6 Claims. (Cl. 56—98)

This invention relates generally to agricultural machines of the type known as forage harvesters. More specifically, it relates to a two-row row crop header for forage harvesters of the type having an infeed opening in the front end thereof and upper and lower feed rolls or the like in the opening to receive crop material and feed it rearwardly into the harvester chopper unit.

As is well known, a single harvester is usually provided with a variety of different types of removable headers for use in harvesting different types of crops. a two-row row crop header has a wedge-shaped central divider which travels between the rows to be harvested, and left and right dividers, or fenders, which separate the two rows to be harvested from the adjacent rows. The divider and fenders funnel the stalks to two stalk severing devices which cut the stalks from the ground. Various conveyors, usually lugged chains, convey the severed crop to the harvester feed rolls.

The conventional functional approach to row crop header designs has been to provide headers which attempt to hold the stalks erect as they pass through the header and deposit them more or less in an erect position on a feed apron or the like disposed in a relatively large throat area at the rear of the header. The feed apron then carries the severed bottom ends of the stalks into the harvester feed mechanism while the stalks are held erect and urged toward the throat area by the gathering chains and other oncoming stalks. In order to hold the stalks erect as they more through the header, the divider, fenders and gathering chains must be quite high particularly in the throat area of the header. In the design of forage harvester headers for two rows of corn or other row grown crops, the lateral distance between the two stalk severing means, and therefore to a certain extent the overall width of the header, is dictated largely by the standard spacing commonly provided between rows of the crop to be harvested. The stalk severing means must be disposed on the header to travel down the rows of crops. This results in a header of considerable width.

The central divider tapers rearwardly from a pointed front end to the respective stalk cutters. If the central divider is short in fore-and-aft lengths, it has a blunt steeply tapered configuration which tends to push the stalks ahead of it instead of funneling them along its sides to the cutters. This is particularly apparent when attempts are made to harvest crops which have been blown down and tangled by storms or the like, or crops that are thickly tangled by viny weeds. The attempted solution to this problem has been to greatly increase the length of the header in order that the angle of taper of the fenders and central divider may be decreased, thereby giving the header a chance to scoop under down and tangled crops and lift them to a more or less erect position for engagement by the stalk gathering chains and severing means. This has resulted in massive, complex, expensive headers which adversely effect the overall balance and maneuverability of the harvester on which they are mounted, as well as requiring long, power consuming gathering chains. Still, considerable difficulty is experienced in attempting to harvest down and tangled crops and some of the new short hybrid varieties of row crops.

In contrast to the conventional approach, the header of the present invention positively grasps each stalk near the ground and positively drives the severed butt end thereof into the bite of the main harvester feed rolls, the upper portion of the stalk is encouraged to tip over toward a horizontal position to facilitate the feeding action of the harvester feed rolls.

It is an object of this invention to provide a low, narrow, short length two-row row crop header for a forge harvester which readily gathers down and tangled crops as well as tall straight crops.

Another object of this invention is to provide a full width two-row row crop header for a forage harvester having a short fore-and-aft length.

It is another object of this invention to provide a full width two-row row crop header for a forage harvester having a short fore-and-aft length and yet employing fenders and a central divider having a low, slender, tapered configuration.

It is another object of this invention to provide a two-row row crop header of minimal size and weight thereby favorably affecting the maneuverability and overall balance of a forage harvester on which it is mounted, and which header readily gathers both tall straight standing and down tangled stalks.

Another object of this invention is to provide a two-row row crop header which folds the stalks inwardly over the central divider and delivers them cut end first directly into the bite of the forage harvester feed rolls.

It is another object of this invention to provide a rugged two-row row crop header of short length having a minimum number and length of gathering chains and feeding mechanism and therefore capable of manufacture at low cost while having superior stalk handling capability.

It is another object of this invention to provide a two-row row crop header wherein the crop stalks are positively stripped from the gathering chains directly in the bite of the forage harvester feed rolls thereby providing virtually unpluggable operation.

These and other objects and advantages of this invention will be apparent upon reference to the following description and claims taken in conjunction with the accompanying drawings:

FIG. 1 is a front perspective view of the header of the present invention showing its relationship to the infeed opening of a forage harvester unit;

FIG. 2 is a side elevation view of the header seen in FIG. 1 showing the relationship of the header to upper and lower feed rolls in the infeed opening of the forage harvester;

FIG. 3 is a plan view of the header taken as indicated by the line 3—3 in FIG. 2; and FIG. 4 is a fragmentary plan view similar to FIG. 3 but on a smaller scale and with the top lines of the fenders shown in phantom.

Referring now to the drawings in detail, particularly FIG. 1, the reference numeral 10 indicates, generally, a two-row row crop header having a base frame 11 supporting a forwardly tapering central divider 12 and left and right fenders 14 and 15, respectively. The fenders and central divider coact to define a left crop stalk passage 16 and a right stalk passage 18. The passages extend in a fore-and-aft direction through the header and terminate at the infeed opening 19 of a forage harvester 20, a portion of which is shown in phantom lines in FIG. 1. Referring now to FIG. 4, left and right stalk cutters, or sickles, 21 and 22, respectively, are carried by frame 11 and disposed respectively in crop passages 16 and 18. These stalk cutters are disposed adjacent the ground as may be seen in FIG. 2 wherein the stalk cutter 21 and its relationship to the ground G is discernible.

An important feature comtributing to the successful achievement of the objects of this invention is the positioning and inter-relationship of certain edges of the fenders and central divider. This may best be seen from a comparison of FIGS. 3 and 4. In the vertical direction, the crop passages 16 and 18 are defined by upper and lower edges of the fenders and central divider. In extending from front to rear of the header, these edges do not follow the same lines. In FIG. 3, the upper edges of the fenders are visible in solid lines while the lower edges are hidden and shown in phantom. In FIG. 4, the lower edges of the fenders are shown in solid lines while the overlying upper edges are indicated in phantom. The left fender 14 has an upper edge 24 and a lower edge 25 which, respectively, define the upper and lower outboard limits of left passage 16. The right fender 15 has an upper edge 26 and a lower edge 28 which, respectively, define the upper and lower outboard limits of the right crop passage 18. The inboard limits of the respective passages are defined by left upper and lower and right upper and lower edges on the central divider 12. In FIG. 1, the right upper and lower edges 31 and 32, respectively, of the central divider are partially visible while on the left side of the central divider only the upper edge 29 is visible. The left lower edge of the central divider bears the reference numeral 30 in FIG. 2 wherein the forwardmost fractional portion thereof is visible. The lower edges 25 and 28 of the left and right fenders converge rearwardly at predetermined angles from the forwardmost ends of the fenders to the respective outboard sides of stalk cutters 21 and 22. Rearwardly of stalk cutters 21 and 22, the lower fender edges 25 and 28 converge more rapidly, or at angles greater than said predetermined angles. These portions of the fender lower edges are indicated in FIGS. 3 and 4 by the reference numerals 25′ and 28′. These edges terminate in a narrow throat 33 at the rear ends of the respective fenders. A V-shaped ramp, or floor, 34 extends upwardly and rearwardly from the stalk cutters 21 and 22 to the header throat 33. The portions 25′ and 28′ of the fender lower edges follow the upward and rearward incline of floor 34, while the forward portions, indicated by the numerals 25 and 28, of the lower fender edges extend substantially horizontally in front of the stalk cutters 21 and 22.

It will be apparent from FIGS. 3 and 4 that the upper edges 25 and 26 of fenders 14 and 15 converge rearwardly from the front ends of the fenders to the throat area of the header along lines passing substantially over the inboard sides of the respective stalk cutters 21 and 22. It will also be apparent from FIG. 1 that the upper fender edges 24 and 26 slope gradually upwardly from the respective front ends of the fenders. The lower edges 30 and 32 of the central divider 12 diverge rearwardly substantially horizontally from the front end of the central divider to the inboard sides of the respective stalk cutters 21 and 22. Rearwardly of the stalk cutters, these edges follow the upward incline of floor 34 and converge to a point 35 at the rear of the central divider. The portions of divider lower edges 30 and 32 rearwardly of stalk cutters 21 and 22 extend substantially parallel to the portions 25′ and 28′ of the lower edges of the fenders. The upper edges 29 and 31 of the central divider diverge rearwardly from the front end of the divider to locations indicated by the reference numerals 36 and 38. As may be seen in FIGS. 3 and 4, these locations are spaced forwardly from the stalk cutters 21 and 22. The sides of the central divider, indicated by the reference numeral 39 in FIG. 1, extend substantially vertically between the divider upper edges 29 and 31 and the lower edges 30 and 32. At the afore-mentioned locations 36 and 38, the divider upper edges 29 and 31 converge rearwardly substantially parallel to the fender upper edges 24 and 26 as may be seen in both FIGS. 3 and 4. These portions of the divider upper edges are indicated, respectively, by the reference numerals 29′ and 31′. This offsetting, so to speak, of the upper passage defining edges inwardly from the lower passage defining edges in effect narrows and streamlines the central divider as well as narrowing the overall width of the top portion of the header while still permitting full width spacing between the stalk cutters adjacent the ground. There are no sharp angles along the upper edges of the central divider to impede rearward movement of the stalks. The narrowing of the central divider and the passing of the fender top edges on the inboard sides of the stalk cutters, causes the fender top edges to engage crop stalks above the ground and fold them laterally inwardly over the central divider before their butt ends are cut from the ground by the stalk cutters. This inward folding of the stalks enables the overall height of the fenders to be lowered in comparison to conventional headers without danger of the stalks "hairpinning" outwardly over the fenders and jamming the header in tall straight standing crops. The effect of lowering and narrowing the upper lines of the header provides the additional advantage of enabling a gentle forward taper configuration to the divider and fenders with a header of considerably less fore-and-aft length than conventional headers.

A first pair of endless gathering chains numbered 40 and 41, respectively, are provided on the left and right fenders 14 and 15 and have operating, or feeding, reaches extending along the upper edges 24 and 26 of the respective fenders. The gathering chains 40 and 41 are provided with the usual stalk engaging lugs 42. As best seen in FIG. 3, the gathering chains 40 and 41 are entrained about idler sprockets 44 and 45 journalled near the forwardmost ends of the respective fenders. Near the rear of the header the chains 40 and 41 are entrained around driving sprockets 46 and 48 journalled on the respective left and right fenders. Guide sprockets 49 and 50 journalled on the respective fenders in positions substantially overlying the respective stalk cutters 21 and 22 engage the chains 40 and 41 and fix their line of travel relative to the portions 29′ and 31′ of the upper edges of the central divider. Angle members 51 and 52 (see FIG. 1) carried by the sides of the central divider just under the upper edge portions 29′ and 31′ coact with the lugs 42 on chains 40 and 41 to positively confine each stalk as it is moved rearwardly into severing engagement with the stalk cutters 21 and 22.

A second pair of endless stalk gathering conveyors 54 and 55 are disposed on the central divider 12. The gathering conveyors, or chains 54 and 55 are respectively entrained about leading idler sprockets 56 and 58, trailing driving sprockets 59 and 60 and intermediate idler guide sprockets 61 and 62. This second pair of gathering chains are inclined upwardly and rearwardly substantially parallel to the plane of the V-shaped floor 34, they each have a feeding reach which begins in front of the respective stalk cutters at the sprockets 56 and 58 and follows the adjacent lower edge 30 or 32 of the central divider rearwardly to the respective stalk cutter 21 or 22 and then extends rearwardly and inwardly to the driving sprockets 59 and 60. Movement of the lugs on chains 54 and 55 into the side walls of the central divider positively strips crop stalks from the lugs on chains 54 and 55. A third pair of stalk gathering endless chains 64 and 65 (see FIG. 4) are provided on the respective left and right fenders 14 and 15. These gathering chains are entrained respectively about forwardly located idler sprockets 66 and 68 which are disposed, respectively, on the outboard sides of stalk cutters 21 and 22. Chains 64 and 65 have feeding reaches extending rearwardly along the upwardly and inwardly inclined portions 25′ and 28′ of fender lower edges 25 and 28. They are entrained about rearwardly located driving sprockets 70 and 71 disposed in the throat 33 of the header. Stripper plates 72 and 74 respectively, are disposed adjacent the respective chains 64 and 65 at the rearmost ends thereof. As the lugs on chains 64 and 65 pass around the respective driving sprockets 70 and 71, they move between stripper plates 72 and 74. The curved inner rearward edges of the plates 72 and 74 positively strip the butt ends of stalks from the lugs of chains 64 and 65. As may be seen in FIG. 2, wherein the forward edge of feed opening 19 of the forage harvester, and its upper and lower feed rolls 76 and 78, respectively, are visible, the release point of chains 64 and 65 is actually within the material receiving bite of the harvester receiving rolls (see also FIG. 3).

In FIG. 3, the main drive sprocket 80 and its driving chain 81 for the header gathering chains is visible. A jack shaft 82 carries sprocket 80 and extends transversely across the header below V-shaped floor 34. Jack shaft 82 carries a sprocket 84 disposed substantially in the center of the header. An endless chain 85 extends forwardly from sprocket 84 to a drive sprocket and short jack shaft assembly 86 disposed between the drive sprockets 59 and 60 of the second pair of endless gathering chains. Bevel gearing indicated at 88 in FIGS. 2 and 3, drives the shafts of sprockets 59 and 60. On main jack shaft 82, in underlying relation to the drive sprockets 70 and 71 of the third pair of endless gathering means, bevel gearing 90 (see FIG. 2) is provided to drive the shafts of sprockets 70 and 71. Short shafts 91 extend upwardly, forwardly and outwardly from the sprockets 70 and 71 and carry universal couplings 92 and 94 (see FIG. 2) on each end thereof for transferring driving power from the sprockets 70 and 71 of the third pair of endless gathering means to the driving sprockets 46 and 48 of the first pair of endless gathering means. In FIG. 2 it may be seen that the first pair of gathering chains extend downwardly and forwardly at a steeper angle than the second and third pairs thereby contributing to the short overall length of the header. The stalk cutters 21 and 22 are conventional sickle-type mower knives mounted on a reciprocable knife bar 95 which projects from the left side of the header adjacent the ground and carries a connecting ball or the like 96. Sickle driving wobbler mechanism, or the like, which is provided on the main forage harvester unit, is connected to the knife driving ball 96 to reciprocally drive the same as in conventional row crop headers.

For a better understanding of the relationship of the present invention to the feed opening and feed rolls of a main forage harvester unit, reference and comparison may be made to my previous U.S. Patents 3,100,369 and 3,127,723 relating to single-row row crops headers.

In the present header, the first pair of gathering chains 40 and 41 engage the stalks and move them rearwardly along fender upper edges 24 and 26. Since the lines of edges 24 and 26 pass on the inboard side of the stalk cutters, movement of the stalks therealong begin to fold the stalks laterally inwardly over the central divider 12. The narrowness of the upper portion of central divider 12 enables this divider to be lower than conventional row crop header central dividers, thereby enhancing its ability, although it has short fore-and-aft length, to scoop under down crops. The lowness of the central divider also facilitates the folding of the stalks thereover by the fender upper edges. As the butt ends of the stalks approach the stalk severing means, they are engaged by the lugs of the second pair of gathering chains 54 and 55. By the time the stalks are moved rearwardly over the stalk severing devices, they are fully engaged by the lugs of all three pairs of gathering chains thus insuring cut-off of the stalks from the ground and positive conveying of the butt ends of the stalks around the corners of the central divider lower edges 30 and 32 at sprockets 61 and 62. Upwardly from the stalk severing means the stalks are confined between the lugs 42 of the first pair of gathering chains and the angle members 51 and 52 on the sides of the central divider. After cut-off, the stalks are gradually released from the first and second pairs of endless gathering members as the lugs of these members retract within the respective fenders and central divider edges along which their feeding reaches extend. The cut-off butt ends of the stalks are finally released by the third pair of gathering members as the lugs thereon turn about driving sprockets 70 and 71 and withdraw within stripper plates 72 and 74. As previously mentioned, and as visible in FIG. 2, final release of the stalks by the third pair of endless gathering members occurs in the material receiving and feeding bite of the main harvester feed rolls 76 and 78. In providing a header of the short fore-and-aft length, obviously the weight of the header and the balance and maneuverability of the overall harvester-header combination are improved. In the present invention the total width of the header has also been reduced while maintaining full row lateral spacing between the crop severing means, thus adding further to the reduction of weight and cost of the header. The reduction in width and length afforded by the present header design enables gathering members of minimum number and length to positively deliver stalks directly to the harvester feed rolls, thereby improving the feeding ability of the header as well as reducing its manufacturing cost. This has been accomplished in the present while maintaining the low gentle sloping forwardly tapering configuration of the fenders and central divider necessary for harvesting down crops and previously obtainable only on headers having considerably greater fore-and-aft length and requiring more gathering and feeding members to transport the stalks to the main harvester feed rolls.

In comparison to conventional headers which attempt to "herd" the stalks vertically through the header to a large throat area wherein the harvester feeder can grasp them, the present header moves under the stalks, grasps each stalk at its butt end and positively feeds it to the harvester feed rolls. Whether the crop is tall and straight, short, or blown down and tangled, the butt end of the stalk is within the grasp of the second and third sets of gathering chains. The lowness and shortness of the header disposes the first set of gathering chains much closer vertically to the second and third sets than in conventional headers and positions them to grasp even the shortest hybrid stalks. In actual practice it has been found in all types of crops that with the short low lines of the present header when the butt end of the stalk is positively controlled and fed into the harvester, the rest of the stalk follows.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A row crop header for a forage harvester of the type having an infeed opening in the front end thereof and feed means disposed in said opening and having a crop material receiving bite for receiving crop stalks from said header and feeding said stalks rearwardly into said harvester, said row crop header comprising a frame adapted to be mounted on the front end of a forage harvester and extending in front of said harvester infeed opening, a central crop divider on said frame, left and right fenders on said frame disposed respectively on opposite sides of said central divider and coacting with said central divider to define left and right generally fore-and-aft extending passages for rows of crop stalks, left and right stalk cutters on said frame adjacent the ground and disposed respectively in said left and right passages, said fenders each having an upper edge and a lower edge respectively defining the upper and lower outboard limits of said left and right passages, said central divider having left upper and lower edges and right upper and lower edges respectively defining the upper and lower inboard limits of said left and right passages, said lower edges of said left and right fenders converging rearwardly at pre-determined angles from the front ends of said fenders to said left and right stalk cutters respectively and converging rearwardly from said stalk cutters to said harvester feed means at angles greater than said pre-determined angles, said left and right lower edges of said central divider diverging rearwardly at predetermined angles from the front end of said divider to said stalk cutters and converging rearwardly from said stalk cutters generally parallel respectively to the adjacent portions of said left and right fender lower edges, said upper edges of said left and right fenders converging rearwardly from the front ends of the fenders along lines passing generally over the inboard sides of the respective left and right stalk cutters, said left and right upper edges of said central divider diverging rearwardly from the front end of the divider to locations spaced forwardly of said stalk cutters and converging rearwardly from said locations generally parallel to the respective upper edges of said left and right fenders, a first pair of stalk gathering endless conveyors on said fenders and respectively having feeding reaches extending along said left and right fender upper edges, a second pair of stalk gathering endless conveyors on said central divider and having feeding reaches respectively extending along the left and right lower edges of the divider from locations in front of said stalk cutters to locations rearwardly of said stalk cutters, and a third pair of stalk gathering endless conveyors having feeding reaches respectively extending along said left and right fender lower edges, said feeding reaches of said third pair of stalk gathering endless conveyors initiating respectively substantially at said left and right stalk cutters and terminating respectively in said material receiving bite of said harvester feed means.

2. A row crop header for a forage harvester of the type having an infeed opening in the front end thereof and upper and lower feed rolls disposed in said opening and having a crop material receiving bite for receiving crop stalks from said header and feeding said stalks rearwardly into said harvester, said row crop header comprising a frame adapted to be mounted on the front end of a forage harvester and extending in front of said harvester infeed opening, a central crop divider on said frame and having a front end and a rear end, left and right fenders on said frame disposed respectively on opposite sides of said central divider and coacting with said central divider to define left and right generally fore-and-aft extending passages for rows of crop stalks, said fenders having front ends and rear ends, said passages extending from the front ends of said divider and fenders to the rear ends thereof, left and right stalk cutters on said frame adjacent the ground and disposed respectively in said left and right passages, said fenders each having an upper edge and a lower edge respectively defining the upper and lower outboard limits of said left and right passages, said central divider having left upper and lower edges and right upper and lower edges respectively defining the upper and lower inboard limits of said left and right passages, said lower edges of said left and right fenders converging rearwardly at predetermined angles from said front ends of said fenders to said left and right stalk cutters respectively and converging rearwardly from said stalk cutters at angles greater than said predetermined angles, said left and right lower edges of said central divider diverging rearwardly at predetermined angles from said front end of said divider to said stalk cutters and converging rearwardly from said stalk cutters generally parallel respectively to the adjacent portions of said left and right fender lower edges, said upper edges of said left and right fenders converging from the front ends to the rear ends of the fenders along lines passing generally over the inboard sides of the respective left and right stalk cutters, said left and right upper edges of said central divider diverging rearwardly from the front end of the divider to locations spaced forwardly of said stalk cutters and converging rearwardly from said locations parallel to the respective upper edges of said left and right fenders, a first pair of stalk gathering endless conveyors on said fenders and having feeding reaches extending along said left and right fender upper edges, a second pair of stalk gathering endless conveyors on said central divider and having feeding reaches respectively extending along the left and right lower edges of the divider from locations in front of said stalk cutters to locations rearwardly of said stalk cutters, and a third pair of stalk gathering endless conveyors having feeding reaches extending along said left and right fender lower edges, said feeding reaches of said third pair of stalk gathering endless conveyors initiating respectively substantially at said left and right stalk cutters and terminating respectively in said material receiving bite of said harvester feed rolls.

3. A row crop header for a forage harvester as recited in claim 2 wherein said lower edges of said fenders and divider extend generally horizontally rearwardly from said divider and fender front ends to said stalk cutters and then sloped upwardly and rearwardly to said material receiving bite of said harvester feed rolls, said passages having an upwardly and rearwardly inclined floor extending rearwardly from said stalk cutters to said material receiving bite of said harvester feed rolls.

4. A row crop header for a forage harvester as recited in claim 3 wherein said second and third endless conveyors are operatively disposed substantially in a common plane parallel to and adjacent said floor, and said first pair of endless conveyors is operatively disposed in a common plane inclined downwardly and forwardly at a steeper slope than said floor.

5. A row crop header for a forage harvester as recited in claim 2 wherein said endless conveyors comprise chains having laterally projecting stalk engaging lugs thereon, and means on said fenders adjacent the rear ends thereof for stripping stalks from the lugs of said third endless conveyor within the material receiving bite of said harvester feed rolls.

6. A row crop header for a forage harvester as recited in claim 5 wherein said central divider has left and right sides extending generally vertically downwardly from said left and right divider upper edges, said sides extending downwardly to said lower eges from adjacent the front of said central divider rearwardly to said locations spaced forwardly of said stalk cutters, said sides extending rearwardly from said locations in substantially vertical planes parallel respectively to said left and right fender upper edges and being disposed inwardly from said divider left and right lower edges, and flange means on the inwardly disposed portions of said sides coacting respectively with said lugs on said first pair of stalk gathering endless conveyors to prevent disengagement of stalks from said first conveyor lugs as said stalks pass relatively rearwardly over said stalk cutters.

References Cited
UNITED STATES PATENTS

| | | | |
|---|---|---|---|
| 1,160,777 | 11/1915 | Small | 56—105 |
| 2,371,822 | 3/1945 | Hyman | 56—18 |
| 2,456,404 | 12/1948 | Good | 56—119 XR |

ANTONIO F. GUIDA, *Primary Examiner.*